United States Patent
Yin

(10) Patent No.: US 12,538,120 B2
(45) Date of Patent: Jan. 27, 2026

(54) PRIVACY SETTING METHOD AND APPARATUS FOR UWB DETECTION, AND ELECTRONIC DEVICE

(71) Applicant: VIVO MOBILE COMMUNICATION CO., LTD., Dongguan (CN)

(72) Inventor: Hong Yin, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 212 days.

(21) Appl. No.: 18/231,776

(22) Filed: Aug. 8, 2023

(65) Prior Publication Data

US 2023/0388781 A1    Nov. 30, 2023

Related U.S. Application Data

(63) Continuation of application No. PCT/CN2022/074042, filed on Jan. 26, 2022.

(30) Foreign Application Priority Data

Feb. 9, 2021    (CN) .......................... 202110182230.4

(51) Int. Cl.
*H04W 12/02*    (2009.01)
*H04W 8/00*    (2009.01)
*H04W 12/102*    (2021.01)

(52) U.S. Cl.
CPC ........... *H04W 12/02* (2013.01); *H04W 8/005* (2013.01)

(58) Field of Classification Search
CPC ............... H04W 12/02; H04W 8/005
(Continued)

(56) References Cited

U.S. PATENT DOCUMENTS 9,924,309 B2 *  3/2018  Lipman ................ H04L 67/306
10,467,580 B1 *  11/2019  Davidson ......... G06Q 10/08355
(Continued)

FOREIGN PATENT DOCUMENTS

CN    101309468 A    11/2008
CN    102014337 A    4/2011
(Continued)

OTHER PUBLICATIONS

International Search Report issued in corresponding International Application No. PCT/CN2022/074042, mailed Mar. 22, 2022, 5 pages.
(Continued)

*Primary Examiner* — Haresh N Patel
(74) *Attorney, Agent, or Firm* — IPX PLLC

(57) ABSTRACT

A privacy setting method for Ultra-Wideband (UWB) detection, and an electronic device are provided. The method includes: when a first interface is displayed, receiving a first input by a user. The first interface includes at least one device identifier and at least one control. Each device identifier is used to indicate a device that is detected by using a UWB function. Each control corresponds to a privacy setting when the electronic device is detected by another device by using the UWB function. The first input is an input by the user for a target control in the at least one control. The method further includes: in response to the first input, enabling a privacy setting corresponding to the target control.

14 Claims, 10 Drawing Sheets

(58) Field of Classification Search
USPC .......................................................... 726/1
See application file for complete search history.

(56) References Cited

U.S. PATENT DOCUMENTS

| | | | | |
|---|---|---|---|---|
| 11,729,576 | B2* | 8/2023 | Kerr | ...................... H04W 4/021 |
| | | | | 455/456.3 |
| 2008/0312946 | A1* | 12/2008 | Valentine | ............. G06Q 20/382 |
| | | | | 705/64 |
| 2018/0205682 | A1* | 7/2018 | O'Brien, V | ........ G06Q 10/0833 |
| 2018/0350144 | A1* | 12/2018 | Rathod | ............. G06Q 20/3224 |
| 2020/0135005 | A1* | 4/2020 | Katz | ................... H04M 7/0021 |
| 2020/0168080 | A1* | 5/2020 | Kim | ....................... G08G 1/164 |
| 2020/0275369 | A1* | 8/2020 | Foster | ............... H04W 52/0235 |
| 2020/0387914 | A1* | 12/2020 | Rathod | .................... G06F 3/048 |
| 2020/0408009 | A1* | 12/2020 | Bussis | ..................... E05B 81/78 |
| 2021/0136556 | A1* | 5/2021 | Lee | ....................... H04W 76/15 |
| 2023/0179951 | A1 | 6/2023 | Yixiang et al. | |

FOREIGN PATENT DOCUMENTS

| | | | | |
|---|---|---|---|---|
| CN | 105683774 | A | | 6/2016 |
| CN | 106331035 | A | | 1/2017 |
| CN | 108429856 | A | | 8/2018 |
| CN | 111095012 | A | | 5/2020 |
| CN | 111125770 | A | | 5/2020 |
| CN | 112087706 | A | | 12/2020 |
| CN | 112261572 | A * | 1/2021 | ........... G06F 3/0488 |
| CN | 112948873 | A | | 6/2021 |
| WO | WO-2020021319 | A1 * | 1/2020 | ........... A63F 13/213 |

OTHER PUBLICATIONS

Extended European Search Report issued in related European Application No. 227521390.0, mailed Jul. 2, 2024, 9 pages.

Shubina Viktoriia et al: "Privacy versus Location Accuracy in Opportunistic Wearable Networks", Jun. 2, 2020, XP033780303, 6 pages.

First Office Action issued in related Chinese Application No. 202110182230.4, mailed Jan. 9, 2024, 7 pages.

* cited by examiner

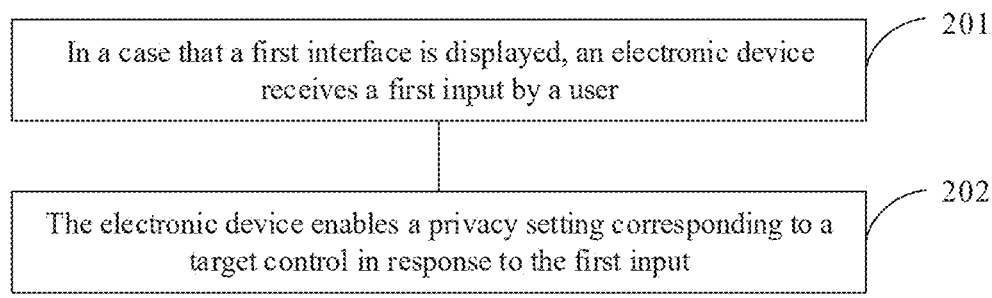
FIG. 1
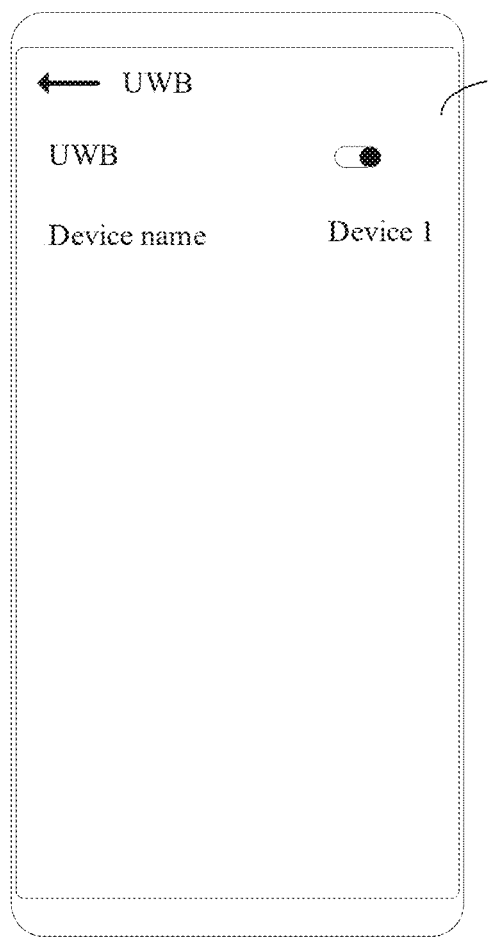
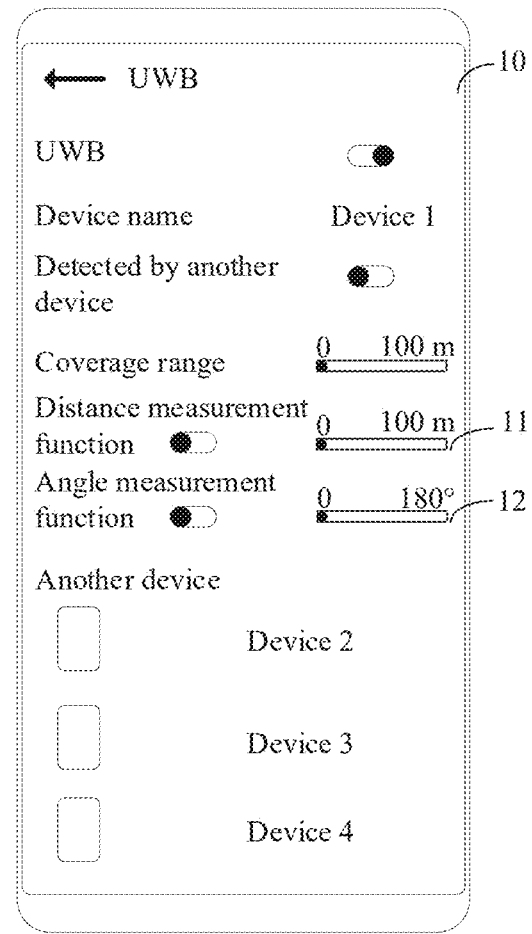
FIG. 2A  FIG. 2B

PRIVACY SETTING METHOD AND APPARATUS FOR UWB DETECTION, AND ELECTRONIC DEVICE

CROSS-REFERENCE TO RELATED APPLICATIONS

This application is a continuation of International Application No. PCT/CN2022/074042, filed on Jan. 26, 2022, which claims priority to Chinese Patent Application No. 202110182230.4, filed in China on Feb. 9, 2021. The entire contents of each of the above-referenced applications are expressly incorporated herein by reference.

TECHNICAL FIELD

This application relates to the field of communication technologies, and specifically, to a privacy setting method and apparatus for UWB detection, and an electronic device.

BACKGROUND

At present, when a user uses a social application of an electronic device, some functions in the social application, such as a function of finding nearby friends, a function of sharing a location, may be used to meet a social requirement of the user. Generally, the electronic device can measure a distance between two devices via an Ultra-Wideband (UWB) module integrated in the electronic device, to implement device positioning, device finding, and the like.

However, when the distance between the devices is measured via the UWB module, because precision of distance measurement via the UWB module can reach a centimeter level, it is easy for another user to perform distance measurement and angle measurement via a plurality of UWB modules to obtain precise location information of the user. As a result, user privacy is leaked, and safety of the electronic device performing detection via the UWB module is poor.

SUMMARY

Embodiments of this application are intended to provide a privacy setting method and apparatus for UWB detection, and an electronic device.

This application is implemented as follows.

According to a first aspect, an embodiment of this application provides a privacy setting method for UWB detection, applied to an electronic device. The privacy setting method for UWB detection includes: in a case that a first interface is displayed, receiving a first input by a user, where the first interface includes at least one device identifier and at least one control, each device identifier is used to indicate a device that is detected by using a UWB function, each control corresponds to a privacy setting when the electronic device is detected by another device by using the UWB function, and the first input is an input by the user for a target control in the at least one control; and in response to the first input, enabling a privacy setting corresponding to the target control.

According to a second aspect, an embodiment of this application provides a privacy setting apparatus for UWB detection. The privacy setting apparatus for UWB detection includes a receiving module and an enabling module. The receiving module is configured to: in a case that a first interface is displayed, receive a first input by a user, where the first interface includes at least one device identifier and at least one control, each device identifier is used to indicate a device that is detected by using a UWB function, each control corresponds to a privacy setting when an electronic device is detected by another device by using the UWB function, and the first input is an input by the user for a target control in the at least one control. The enabling module is configured to: in response to the first input received by the receiving module, enable a privacy setting corresponding to the target control.

According to a third aspect, an embodiment of this application provides an electronic device, where the electronic device includes a processor, a memory, and a program or an instruction stored in the memory and executable on the processor, where when the program or the instruction is executed by the processor, the steps of the method according to the first aspect are implemented.

According to a fourth aspect, an embodiment of this application provides a readable storage medium, where the readable storage medium stores a program or an instruction, and when the program or the instruction is executed by a processor, the steps of the method according to the first aspect are implemented.

According to a fifth aspect, an embodiment of this application provides a chip, where the chip includes a processor and a communications interface, the communication interface is coupled to the processor, and the processor is configured to run a program or an instruction to implement the method according to the first aspect.

BRIEF DESCRIPTION OF DRAWINGS

FIG. 1 is a first schematic diagram of a privacy setting method for UWB detection according to an embodiment of this application;

FIGS. 2A and 2B each is a first schematic diagram of an example of an interface of a mobile phone according to an embodiment of this application;

DETAILED DESCRIPTION

Figure 3:
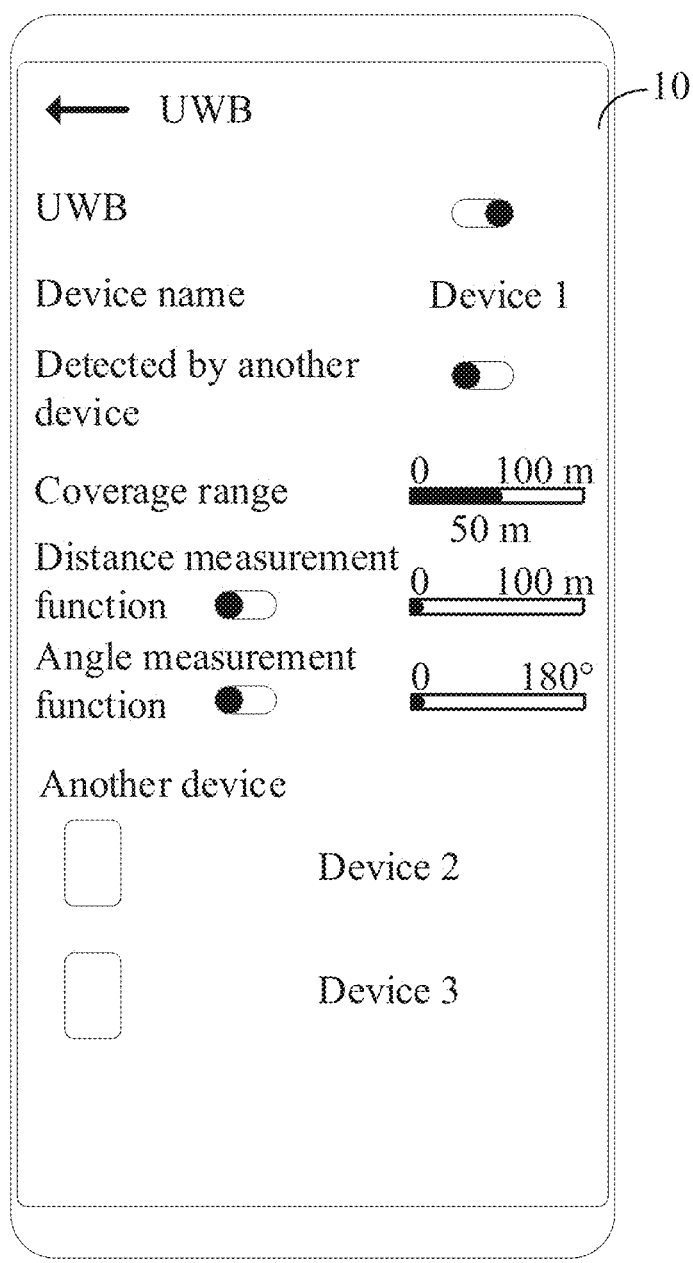
FIG. 3 is a second schematic diagram of an example of an interface of a mobile phone according to an embodiment of this application.

The following clearly describes the technical solutions in the embodiments of this application with reference to the accompanying drawings in the embodiments of this application. Apparently, the described embodiments are some rather than all of the embodiments of this application. All other embodiments obtained by a person of ordinary skill in the art based on the embodiments of this application without creative efforts shall fall within the protection scope of this application.

The terms "first", "second", and the like in the specification and claims of this application are used to distinguish between similar objects rather than to describe a specific order or sequence. It should be understood that the data used in this way is interchangeable in appropriate circumstances so that the embodiments of this application can be implemented in other orders than the order illustrated or described herein, and "first", "second", and the like are usually for distinguishing same-type objects but not limiting the number of objects, for example, a first object may be one or multiple. In addition, in the specification and claims, "and/or" represents at least one of connected objects, and the character "/" generally indicates an "or" relationship between contextually associated objects.

The following describes in detail a privacy setting method for UWB detection provided in the embodiments of this application by using specific embodiments and application scenarios thereof with reference to the accompanying drawings.

As a mature communication manner, UWB has been widely used in the field of positioning due to high precision of distance measurement and angle measurement by the UWB. Currently, a plurality of electronic devices perform positioning (such as "finding nearby people" and "seeing nearby friends"), finding items, and the like via an integrated UWB module. A distance between two devices can be measured by the UWB. Depending on power of the UWB, coverage ranges may range from a few meters to hundreds of meters, which is very suitable for near-field social occasions. However, because precision of distance measurement by the UWB can reach a centimeter level, and an angle measurement may be performed in a case of a plurality of antennas, when an electronic device locates another device via a UWB module, it is easy for another user to perform distance measurement and angle measurement by using a UWB device. As a result, precise location information of the electronic device is obtained, which exposes user privacy.

The embodiments of this application propose a privacy protection method for the UWB. In a case that a UWB function is enabled (measurement (such as distance measurement and angle measurement) is performed via the UWB module), the electronic device can display, to the user, a relevant interface for setting the UWB function, so that the user can set, based on a usage requirement of the user, whether to allow the electronic device to be detected by the another device, a coverage range of the UWB (that is, the electronic device is allowed to be detected only by a device within a set coverage range), and precision of the distance measurement and angle measurement (that is, a distance measurement error value and an angle measurement error value are set, so that the anther device cannot accurately obtain the location information of the electronic device). On the premise of meeting a user requirement, location information of the user is blurred to the greatest extent to avoid leakage of the user privacy and protect the user privacy.

An embodiment of this application provides a privacy setting method for UWB detection. FIG. 1 is a flowchart of the privacy setting method for UWB detection provided in this embodiment of this application. The method may be applied to an electronic device. As shown in FIG. 1, the privacy setting method for UWB detection provided in this embodiment of this application may include the following step 201 and step 202.

Step 201: In a case that a first interface is displayed, the electronic device receives a first input by a user.

In this embodiment of this application, the first interface includes at least one device identifier and at least one control, each device identifier is used to indicate a device that is detected by using a UWB function, each control corresponds to a privacy setting when the electronic device is detected by another device by using the UWB function. The first input is an input by the user for a target control in the at least one control.

In this embodiment of this application, the user may first enable a UWB function of the electronic device on a setting interface of the electronic device, so that the electronic device can detect the another device by using the UWB function. In a case that the another device is detected, an identifier (such as a device name) of the detected device and a control for the user to set a function related to UWB detection are displayed on the first interface (where the first interface may be a setting interface or an interface after the setting interface is updated). Then, user may perform the first input on some of the controls, so that the electronic device can apply privacy settings corresponding to the controls.

It should be noted that in a case that the UWB function is disabled, the electronic device cannot detect a device by using the UWB function, and cannot be detected by the another device by using the UWB function. The another device may be another electronic device, or may be another device including a UWB module (or having the UWB function).

For example, in this embodiment of this application, the at least one control includes at least one of the following: a first control, a second control, and a third control. The first control is used to set whether to allow the electronic device to be detected by the another device by using the UWB function, the second control is used to set to allow the electronic device to be detected by a device within a target range by using the UWB function, the third control is used to set a measurement error value between a first device and the electronic device, and the first device is a device for measuring the electronic device.

It can be understood that a privacy setting corresponding to the first control is that a privacy when the electronic device detects the another device may be set to not allow the another device to detect the electronic device by using the UWB function. A privacy setting corresponding to the second control is that the privacy when the electronic device detects the another device may be set to allow only the device within the target range to detect the electronic device by using the UWB function (in other words, a device located outside the target range cannot detect the electronic device by using the UWB function). A privacy setting corresponding to the third control is that measurement precision/a measurement error value is set when the another device measures the electronic device, to blur a measurement value (such as a distance and an angle value) obtained by the another device measuring the electronic device, that is, there is an error in location information (for example, location information determined by a distance or an angle between the another device and the electronic device) of the electronic device determined by the another device, and therefore the another device cannot accurately locate the electronic device.

It should be noted that the electronic device may not respond to a detection signal sent by the another device, so that the another device cannot detect the electronic device by using the UWB function.

For example, in this embodiment of this application, the second control is further used to set to allow the device within the target range to be detected by using the UWB function. It can be understood that, the user may not only set, by using the second control, to allow only the device within the target range to detect the electronic device by using the UWB function, but also set to allow only the electronic device to detect the device within the target range by using the UWB function (in other words, the electronic device cannot detect the device outside the target range by using the UWB function).

For example, in this embodiment of this application, the third control is used to set a distance measurement error value/distance measurement precision. As another example, the third control is used to set an angle measurement error value/angle measurement precision.

For example, in this embodiment of this application, the first input may be a tap input by the user for the first control. As another example, the first input may be a slide input by the user for the second control for adjusting a coverage range (namely, the target range, that is, determining the target range based on a start position and an end position of the slide input) of the UWB. As another example, the first input may be a slide input by the user for the third control for adjusting the measurement error value.

For example, in this embodiment of this application, the first interface further includes at least one of the following: a distance measurement control and an angle measurement control, the distance measurement control is used to enable or disable a distance measurement function, and the angle measurement control is used to enable or disable an angle measurement function. The distance measurement function is used to measure a distance between the electronic device and the another device by using the UWB function, and the angle measurement function is used to measure an angle between the electronic device and the another device by using the UWB function.

It should be noted that, in one manner, the first interface includes at least one device identifier, at least one control (namely, the first control, the second control, and/or the third control), and the measurement control (namely, the distance measurement control and/or the angle measurement control); and in another manner, the first interface includes at least one device identifier and at least one control, and the at least one control includes at least one of the following: the first control, the second control, the third control, the distance measurement control, and the angle measurement control.

It can be understood that after the user enables the distance measurement function, the electronic device can measure the distance between the electronic device and the another device by using the UWB function. After the distance measurement function is disabled, the electronic device cannot measure the distance between the electronic device and the another device by using the UWB function. In some alternative embodiments, after the user enables the angle measurement function, the electronic device can measure an angle value between the electronic device and the another device by using the UWB function. After the angle measurement function is disabled, the electronic device cannot measure the angle value between the electronic device and the another device by using the UWB function. In addition, the electronic device may locate the another device based on the distance between the electronic device and the another device. As another example, the electronic device may locate the another device based on the distance between the electronic device and the another device and the angle value between the electronic device and the another device. It should be noted that a specific method for the electronic device locating the another device is described in the following embodiments, and details are not described herein.

Exemplarily, the following uses an example in which the electronic device is a mobile phone for description. As shown in FIG. 2A, the mobile phone displays a setting interface 10. The setting interface 10 includes a UWB function control and a name of the mobile phone (for example, a device 1), and the user may tap for performing an input on the UWB function control in the setting interface 10, so that the mobile phone enables the UWB function to detect a device by using the UWB function. In a case that the mobile phone detects another devices, as shown in FIG. 2B, the mobile phone may display a name of the detected device (such as a device 2, a device 3, and a device 4) and a plurality of controls (such as a "detected by another device" control, a "coverage range" control, a "distance measurement function" control, an "angle measurement function" control, a "distance measurement precision" control 11, and an "angle measurement precision" control 12) on the setting interface 10. Then, the user may perform the first input on some of the plurality of controls, so that the mobile phone enables privacy settings corresponding to the controls.

It should be noted that, in one manner, the user may perform the slide input on the "coverage range" control to set a coverage range of the UWB (for example, 0 to 100 meters, sliding to a leftmost side indicates a minimum set coverage range (namely, 0 meters), and sliding to a rightmost side indicates a maximum set coverage range (namely, 100 meters)) that can be supported by the UWB. In addition, a user-defined UWB coverage range is displayed to the user in real time, so that a device (namely, the device 1) within the coverage range can detect the mobile phone by using the UWB function, and the mobile phone can detect only the device within the coverage range. With reference to FIG. 2B, as shown in FIG. 3, the user may slide the "coverage range" control to a middle position, that is, a current coverage range of the UWB is 50 meters, so that the mobile phone can detect only a device within the coverage range. For example, a distance between the device 4 and the mobile phone exceeds/is greater than 50 meters, the mobile phone cannot detect the device 4 currently, a name of the device 4 is no longer displayed in the setting interface 10, and the device 4 cannot detect the mobile phone.

In this embodiment of this application, a setting for the coverage range of the UWB is that in free space, a propagation model of an electromagnetic wave is $$Pr = \frac{Pt}{r^n}.$$

Pr is received power, Pt is transmit power, n is a factor related to a propagation environment, and r is a distance between a transmitting device and a receiving device. Minimum power that can be detected by the UWB module of the electronic device (which may also be described as by the electronic device by using the UWB function) is Pmin, and an effective range r that can be covered by the UWB module is achieved by adjusting the transmit power, that is, another device (which may be referred to as a UWB slave device) at a distance of r from the electronic device can detect a signal of the UWB module of the electronic device. Transmit power of the signal is $Pt=Pmin \times r^n$.

Figure 4:
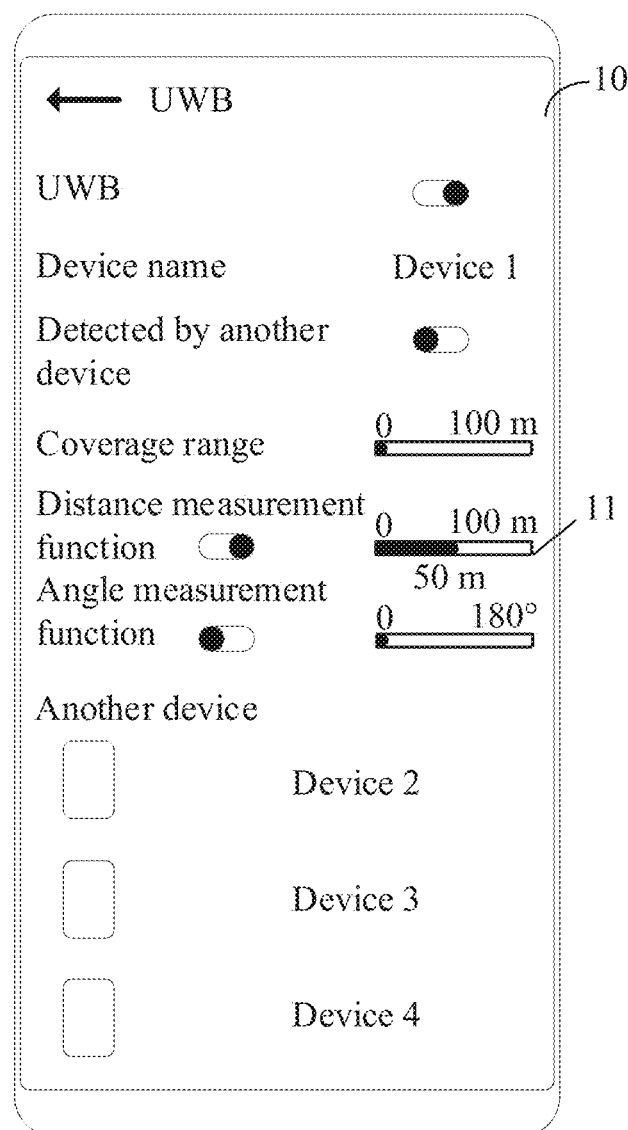
FIG. 4 is a third schematic diagram of an example of an interface of a mobile phone according to an embodiment of this application.

In another manner, the first input may include two sub-inputs. For example, the user may first tap for performing an input on the "distance measurement function" control, so that the mobile phone enables the distance measurement function, and then the user may perform a slide input on the "distance measurement precision" control 11, so that the mobile phone can adjust the distance measurement precision. That is, on the basis of distance measurement precision of the UWB, a distance measurement error value set by the user is added (for example, 0 to 100 meters, sliding to a leftmost side indicates highest set precision (that is, no distance measurement error value is added (in other words, the distance measurement error value is 0 meters), namely, the distance measurement precision of the UWB), and sliding to a rightmost side indicates poorest set precision (for example, it may be set to a maximum distance measurement range (for example, 100 meters) that can be supported by the UWB, that is, the maximum distance measurement range is used as the distance measurement error value)). In addition, user-defined distance measurement precision is displayed to the user in real time to blur a distance, measured by the another device, between the another device and the electronic device. With reference to FIG. 2B, as shown in FIG. 4, after the user taps for performing the input on the "distance measurement function" control, the user may continue to slide the "distance measurement precision" control 11 to a middle position, that is, distance measurement precision/a distance measurement error value is 50 meters. Therefore, the mobile phone can determine a time error value based on the distance measurement error value, and determine two time points (such as a first time point and a second time point described in the following embodiments) based on the time error value to send the two time points to the anther device, so that the another device determines a distance between the another device and the mobile phone (that is, the distance, determined by the another device, between the another device and the mobile phone is a distance with an error from an actual distance) based on the two time points with an error, thereby achieving a purpose of blurring distance measurement of the another device.

Figure 5:
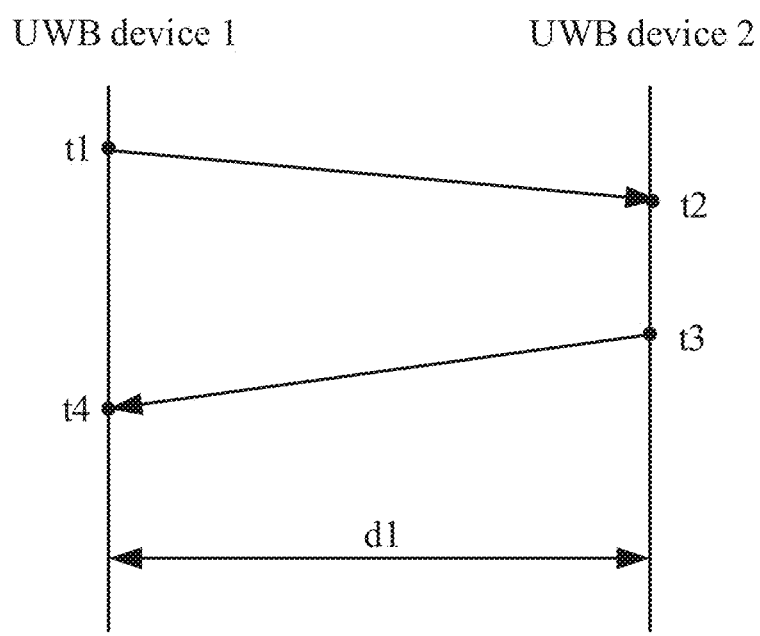
FIG. 5 is a schematic diagram of a principle of distance measurement according to an embodiment of this application.

In this embodiment of this application, when distance measurement is performed by using the UWB function, a bilateral distance measurement manner may be used. There is no need for performing clock synchronization between UWB modules of devices, and system complexity and costs are very low. A principle of distance measurement is shown in FIG. 5. A UWB module (which may be referred to as a UWB device 1 for short) of a device sends a signal at a time point t1. A UWB module (for example, a UWB device 2) of another device receives the signal at a time point t2, and sends a response signal at a time point t3. The UWB device 1 receives the response signal at a time point t4. A distance d1 between the UWB device 1 and the UWB device 2 may be calculated according to the following formula 1, where c is a speed of light.

$$d1 = \frac{c \times [(t4 - t1) - (t3 - t2)]}{2} \quad \text{Formula 1}$$

Figure 6:
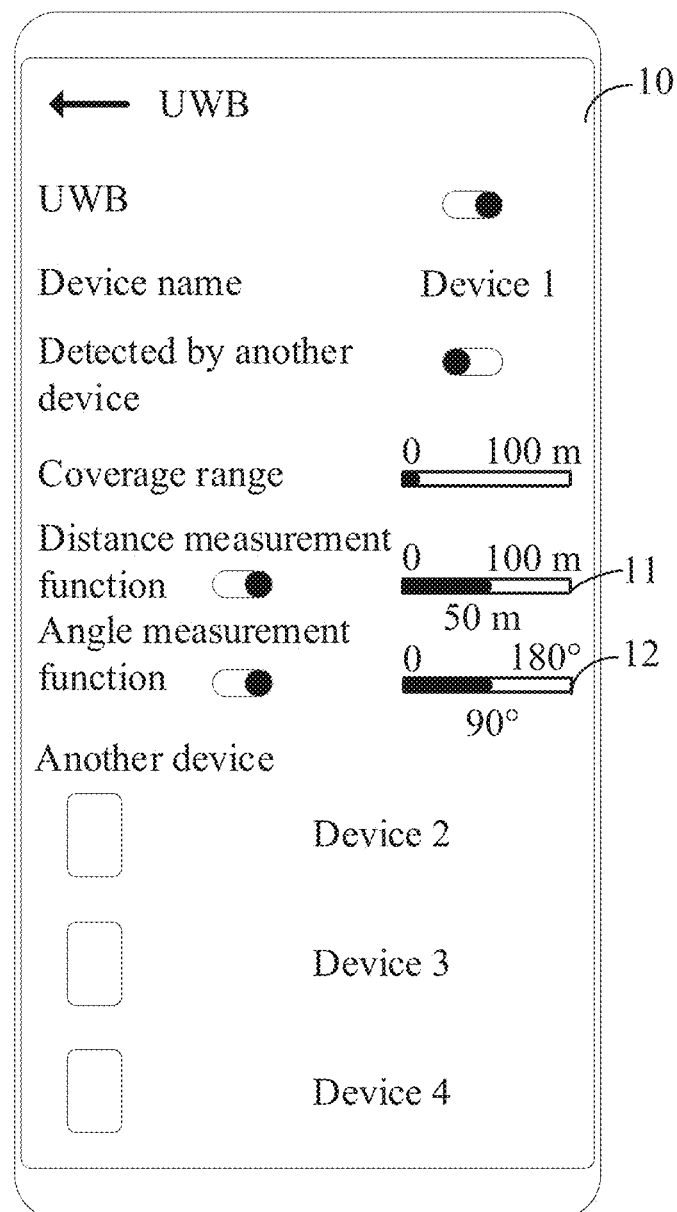
FIG. 6 is a fourth schematic diagram of an example of an interface of a mobile phone according to an embodiment of this application.

In still another manner, the first input may include two sub-inputs. For example, the user may first tap for performing an input on the "angle measurement function" control, so that the mobile phone enables the angle measurement function, and then the user may perform a slide input on the "angle measurement precision" control 12, so that the mobile phone can adjust the angle measurement precision. That is, on the basis of angle measurement precision of the UWB, an angle measurement error value set by the user is added (for example, 0° to 180°, sliding to a leftmost side indicates highest set precision (that is, no angle measurement error value is added (in other words, the angle measurement error value is) 0°, namely, the angle measurement precision of the UWB), and sliding to a rightmost side indicates poorest set precision (for example, it may be set to a maximum angle measurement range (for example, 180°) that can be supported by the UWB, that is, the maximum angle measurement range is used as the angle measurement error value)). In addition, the user-defined angle measurement precision is displayed to the user in real time to blur an angle value, measured by the another device, between the another device and the electronic device. With reference to FIG. 4, as shown in FIG. 6, after setting the angle measurement error value, the user may tap for performing an input on the "angle measurement function" control, and slide the "angle measurement precision" control 12 to a middle position, that is, the angle measurement precision/angle measurement error value is 90°, so that the mobile phone may send an angle value with an error (such as a sum of a correct angle value measured by the mobile phone and the angle measurement error value) to the another device to achieve a purpose of blurring the angle measurement of the another device.

Figure 7:
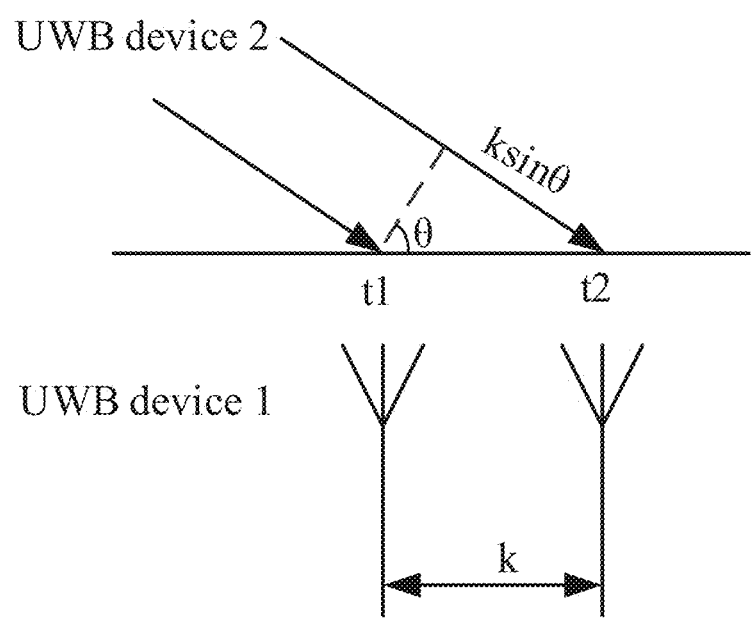
FIG. 7 is a schematic diagram of a principle of angle measurement according to an embodiment of this application.

In this embodiment of this application, when angle measurement is performed by using the UWB function, a UWB device receiving a signal needs to have two antennas. A principle of angle measurement is shown in FIG. 7. A UWB module of an electronic device (which may be referred to as a UWB master device, hereinafter referred to as a UWB device 1 for short) has two UWB antennas. After another device (which may be referred to as a UWB slave device, hereinafter referred to as a UWB device 2) sends a signal, time points at which the two antennas of the UWB device 1 receive the signal are t1 and t2 respectively. The electronic device calculates an angle θ between the UWB device 1 and the UWB device 2 based on a distance k between the two antennas according to the following formula 2.

$$k \times \sin \theta = \frac{c(t2 - t1)}{2} \quad \text{Formula 2}$$

$$\theta = \sin^{-1}\left(\frac{c(t2 - t1)}{2k}\right)$$

In this embodiment of this application, after performing distance measurement and/or angle measurement, the electronic device may locate the another device by using any one of the following two positioning manners. The two positioning manners are a positioning manner based on distance measurement and a positioning manner based on distance measurement and angle measurement.

Figure 8:
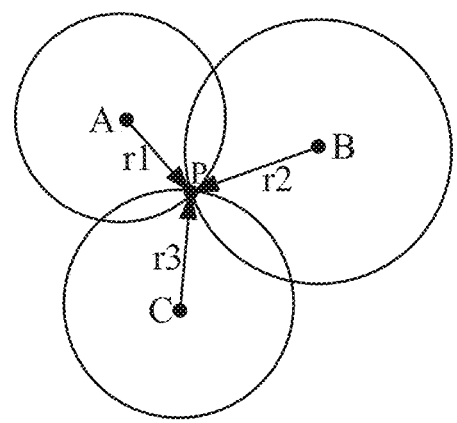
FIG. 8 is a schematic diagram of a positioning manner based on distance measurement according to an embodiment of this application.

For example, FIG. 8 is a schematic diagram of the positioning manner based on distance measurement. Position coordinates of a UWB device P are (Xp, Yp), and position coordinates of a UWB device A, a UWB device B, and a UWB device C are (Xa, Ya), (Xb, Yb), and (Xc, Yc), respectively. A distance between the UWB device A and the UWB device P is r1, a distance between the UWB device B and the UWB device P is r2, and a distance between the UWB device C and the UWB device P is r3. The position coordinates (Xp, Yp) of the UWB device P may be calculated according to the following formula 3.

$$\sqrt{(Xa-Xp)^2+(Ya-Yp)^2}=r1$$

$$\sqrt{(Xb-Xp)^2+(Yb-Yp)^2}=r2$$

$$\sqrt{(Xc-Xp)^2+(Yc-Yp)^2}=r3 \quad \text{Formula 3}$$

Figure 9:
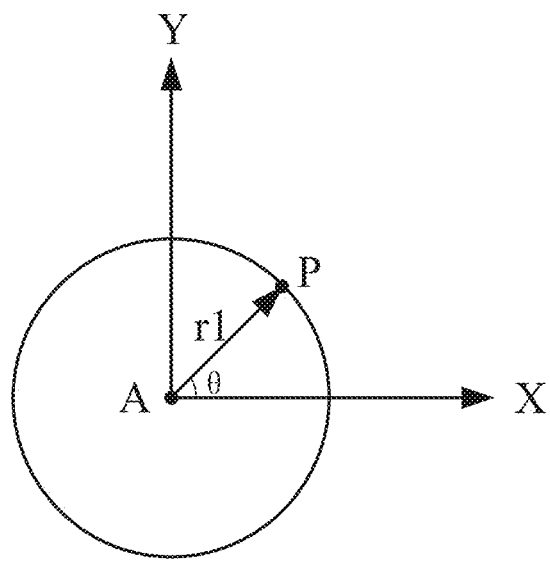
FIG. 9 is a schematic diagram of a positioning manner based on distance measurement and angle measurement according to an embodiment of this application.

For example, FIG. 9 is a schematic diagram of the positioning manner based on distance measurement and angle measurement. The position coordinates of the UWB device P are (Xp, Yp), and the position coordinates of the UWB device A are (Xa, Ya). The distance between the UWB device A and the UWB device P is r1 and an angle is θ. The position coordinates (Xp, Yp) of the UWB device P may be calculated by the following formula 4.

$$Xp=Xa+r1 \times \cos\theta$$

$$Yp=Ya+r1 \times \sin\theta \quad \text{Formula 4}$$

Step 202: The electronic device enables a privacy setting corresponding to the target control in response to the first input.

It can be understood that, in a case that the target control is the first control, the electronic device may enable a privacy setting corresponding to the first control, that is, the electronic device is set to be not allowed to be detected by the another device by using the UWB function, to achieve a purpose of protecting user privacy. In a case that the target control is the second control, the electronic device may enable a privacy setting corresponding to the second control, that is, only a device within a range is set to be allowed to detect the electronic device by using the UWB function, thereby achieve the purpose of protecting the user privacy. In a case that the target control is the third control, the electronic device may enable a privacy setting corresponding to the third control, that is, the measurement error value (for example, the distance measurement error value and the angle measurement error value) is set, to blur the measurement performed on the electronic device by the another device. Therefore, the another device cannot accurately obtain location information of the electronic device, thereby achieving the purpose of protecting the user privacy.

In this embodiment of this application, the user may define whether to allow the electronic device to be detected by the another device, the coverage range of the UWB, the distance measurement precision, the angle measurement precision, and the like, to blur location information of the user to the greatest extent on the premise of meeting various user requirements, avoiding leakage of the user privacy, and improving safety experience.

According to the privacy setting method for UWB detection provided in this embodiment of this application, in a case that the electronic device detects the another device by using the UWB function, the user may perform the first input on some controls (for example, the target control) in the at least one control (where each control corresponds to the privacy setting when the electronic device is detected by the another device by using the UWB function), so that the electronic device can enable a privacy setting corresponding to the control, that is, the user can enable, by user-defining based on a usage requirement, a privacy setting related to detection by using the UWB function, that is, the user can set, in the electronic device, a related privacy function when the another device detects the electronic device by using the UWB function, to avoid the leakage of the user privacy, and achieve the purpose of protecting the user privacy, thereby improving safety of the electronic device performing detection via the UWB module.

For example, in this embodiment of this application, the target control is used to set to allow the electronic device to be detected by the device within the target range by using the UWB function. After step 202, the privacy setting method for UWB detection provided in this embodiment of this application further includes the following step 301 to step 303.

Step 301: In a case that a signal sent by a second device is received, the electronic device obtains a distance between the electronic device and the second device.

It should be noted that, in this manner, the target control is the second control, and the second control is used to set to allow the electronic device to be detected by the device within the target range by using the UWB function.

Step 302: In a case that the distance between the electronic device and the second device is within the target range, the electronic device sends a response signal to the second device.

It can be understood that, in a case that the second device is within the target range, the electronic device may send the response signal to the second device, so that the second device can detect the electronic device by using the UWB function (such as distance measurement and angle measurement) after receiving the response signal.

Step 303: In a case that the distance between the electronic device and the second device is outside the target range, the electronic device prohibits sending the response signal to the second device.

It can be understood that, in a case that the second device is outside the target range, the electronic device may not send the response signal to the second device (in other words, not respond to the signal sent by the second device), so that the second device cannot detect the electronic device by using the UWB function.

In this embodiment of this application, the user may perform the first input on the target control to set a permission of the another device for detecting the electronic device by using the UWB function, so that the electronic device is allowed to be detected only by the device within the target range by using the UWB function, which improves safety of the another device detecting the electronic device via the UWB module.

For example, in this embodiment of this application, the target control is used to set to allow the device within the target range to be detected by using the UWB function. After step 202, the privacy setting method for UWB detection provided in this embodiment of this application further includes the following step 401.

Step 401: In a case that a target device is detected to be located outside the target range, the electronic device deletes a target device identifier in the first interface.

In this embodiment of this application, the target device identifier is an identifier, in the at least one device identifier, indicating the target device.

It should be noted that, in this manner, the target control is the second control, and the second control is used to set to allow the device within the target range to be detected by using the UWB function.

In this embodiment of this application, the electronic device may obtain a distance between the target device and the electronic device, to determine, based on the distance, whether the target device is located outside the target range, in other words, whether the distance between the target device and the electronic device is greater than the target range, thereby determining whether to cancel display of the target device identifier.

It should be noted that, for step 401, an execution order may be that step 401 is performed before "enabling a privacy setting corresponding to the target control" in step 202, that is, step 401 is performed first, and then "enabling a privacy setting corresponding to the target control" in step 202 is performed. In some alternatively embodiments, step 401 and "enabling a privacy setting corresponding to the target control" in step 202 may be performed at the same time, which is not limited in this embodiment of this application.

In this embodiment of this application, the user may perform the first input on the second control (namely, the "coverage range" control), so that the electronic device is allowed to be detected only by the device within the target range by using the UWB function, and only the device within the target range is detected by using the UWB function, thereby improving safety of the electronic device performing detection via the UWB module, and improving flexibility of the electronic device performing detection via the UWB module.

Figure 10:
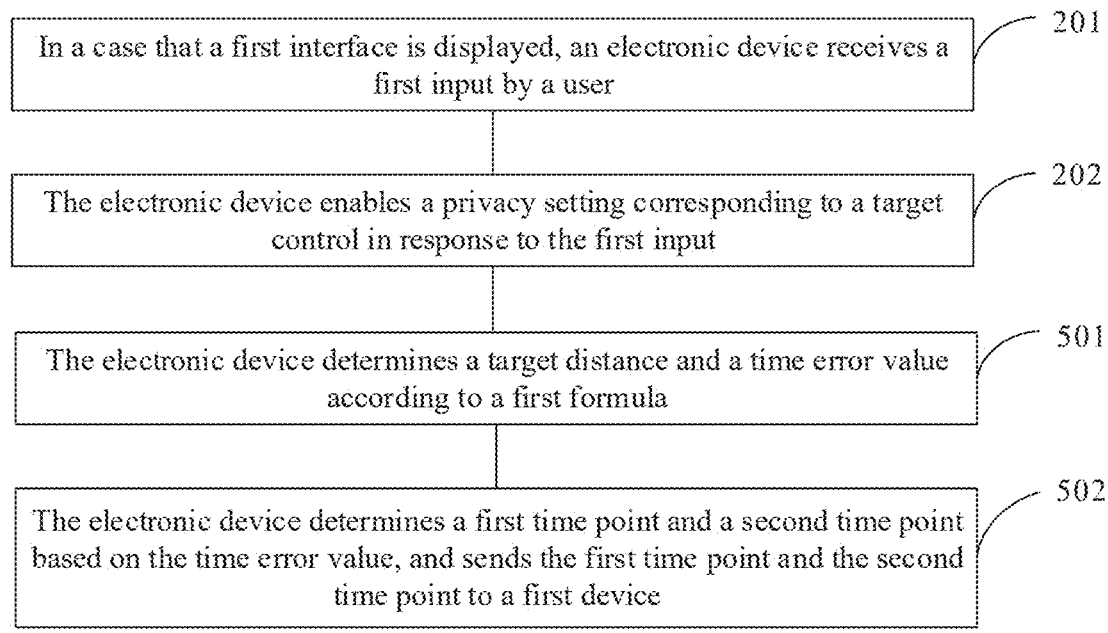
FIG. 10 is a second schematic diagram of a privacy setting method for UWB detection according to an embodiment of this application.

For example, in this embodiment of this application, the target control is used to set the distance measurement error value. With reference to FIG. 1, as shown in FIG. 10, after step 202, the privacy setting method for UWB detection provided in this embodiment of this application further includes the following step 501 and step 502.

Step 501: The electronic device determines a target distance and a time error value according to a first formula.

In this embodiment of this application, the foregoing target distance is an actual distance between the electronic device and the first device.

In this embodiment of this application, the first formula is $$d = \frac{c \times \left[(t4-t1) - \left(t3-t2-\frac{2D}{c}\right)\right]}{2} - D.$$

d is the target distance, c is a speed of light, t1 is a time point at which the first device sends a signal to the electronic device, t2 is a time point at which the electronic device receives the signal sent by the first device, t3 is a time point at which the electronic device sends a response signal to the first device, t4 is a time point at which the first device receives the response signal sent by the electronic device, and D is the distance measurement error value.

It should be noted that, in this manner, the target control is the third control, and the third control is used to set the distance measurement error value.

In this embodiment of this application, according to the principle of distance measurement in FIG. 5, after the user sets the distance measurement error value, a time point at which the UWB device 2 receives a signal of the UWB device 1 is t2. When a time point at which the UWB device 1 sends a response signal is t3, the UWB device 2 only needs to adjust a value of t3 or t2 to reduce a difference by dt, and then a distance (namely, the target distance) between the UWB device 2 and the UWB device 1 can be calculated. For example, after a distance measurement error value D is set, $$d + D = \frac{c \times [(t4-t1) - (t3-t2-dt)]}{2}$$

can be obtained from the principle of distance measurement described in FIG. 5, and $$dt = \frac{2D}{c}$$

can be obtained according to the formula 1, that is, the time error value is $$\frac{2D}{c}.$$

Step 502: The electronic device determines a first time point and a second time point based on the time error value, and sends the first time point and the second time point to the first device.

The first time point and the second time point are used for the first device to determine a measurement distance between the first device and the electronic device. The first time point is a time point corresponding to t2, the second time point is a time point corresponding to t3. The measurement distance is a distance, determined by the first device by using the UWB function, between the first device and the electronic device, and the distance measurement error value is an error value of the measurement distance relative to the target distance.

It should be noted that, the first time point being the time point corresponding to t2 may be understood as that the electronic device notifies the first device of the time point (where the time point is a time point with a time error) at which the electronic device receives the signal sent by the first device. The second time point being the time point corresponding to t3 may be understood as that the electronic device notifies the first device of the time point (where the time point is a time point with a time error) at which the electronic device sends the response signal to the first device.

For example, in this embodiment of this application, the electronic device may add a time value to at least one of t2 and t3 (for example, a time error value is added to t2, and t3 remains unchanged), to determine the first time point and the second time point.

It can be understood that t2 and t3 are real time stamps, and the electronic device may calculate an accurate distance (namely, the target distance) from t1 to t4. If the first time point (hereinafter referred to as t22) and the second time point (hereinafter referred to as t33) determined by the electronic device based on the time error value meet the following condition: t33−t22=t3−t2−dt, there are the following cases.

In one case, t22=t2 and t33=t3−dt, that is, the sent first time point is a time point not added with the time error value, and the sent second time point is a time point subtracting the time error value.

In another case, t33=t3 and t22=t2+dt, that is, the sent first time point is a time point added with the time error value, and the sent second time point is a time point not added with the time error value.

In still another case, t22=t2+dt1 and t33=t3−dt2, where dt1+dt2=dt, that is, the sent first time point is a time point added with the time error value, and the sent second time point is a time point subtracting the time error value.

In this embodiment of the application, after receiving the first time and the second time, the first device calculates the distance between the first device and the electronic device (namely, the measurement distance) according to t1, the first time point (namely, t22), the second time point (namely, t33), and t4 by using the formula 1. For example, for the foregoing three cases, a measurement distance d2 determined by the first device is $$d2 = \frac{c \times [(t4-t1) - (t33 - t22)]}{2} = \frac{c \times [(t4-t1) - (t3 - t2 - dt)]}{2}.$$

It can be understood that the electronic device may accurately calculate the distance between the first device and the electronic device according to the first formula, and then the electronic device may determine the time error value based on the distance measurement error value, and determine two time points with errors based on the time error value to send the two time points to the first device, so that the first device may determine the distance between the first device and the electronic device based on the two time points, and therefore there is an error in the distance, determined by the first device, between the first device and the electronic device. In this way, according to this solution, the distance measurement performed on the electronic device by the first device can be blurred, so that the first device cannot accurately obtain location information of the user, thereby avoiding leakage of user privacy, and improving safety of the electronic device performing distance measurement via the UWB module.

Figure 11:
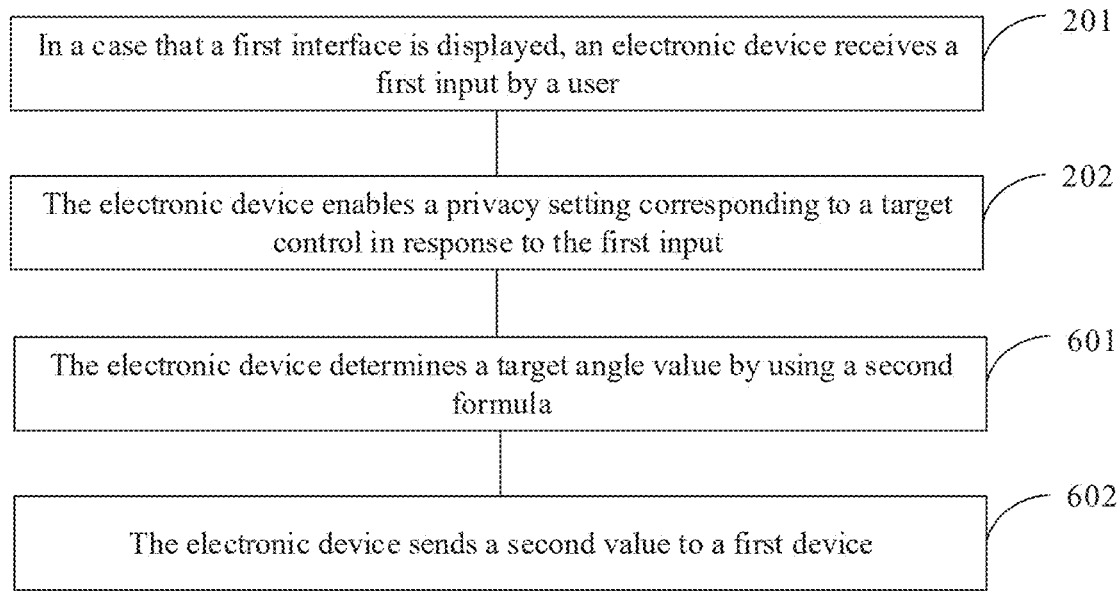
FIG. 11 is a third schematic diagram of a privacy setting method for UWB detection according to an embodiment of this application.

For example, in this embodiment of this application, the target control is the third control, and the third control is used to set the angle measurement error value. The electronic device includes at least two antennas, and the first device includes at least one antenna. With reference to FIG. 1, as shown in FIG. 11, after step 202, the privacy setting method for UWB detection provided in this embodiment of this application further includes the following step 601 and step 602.

Step 601: The electronic device determines a target angle value by using the second formula.

In this embodiment of this application, the target angle value is an angle value between the electronic device and the first device.

In this embodiment of this application, the second formula is $$\theta = \sin^{-1}\left(\frac{c(t2-t1)}{2k}\right).$$

is the target angle value, c is a speed of light, t1 and t2 are time points at which the two antennas of the electronic device receive a signal sent by the first device, and k is a distance between the two antennas of the electronic device.

In this embodiment of this application, according to the principle of angle measurement in FIG. 7, after the user sets the angle measurement error value, because a device receiving a UWB signal requires at least two antennas to perform angle measurement, if the UWB slave device has only one antenna, when the UWB slave device sends a signal, the UWB master device has two antennas, the UWB master device can measure an angle value between the UWB master device and the UWB slave device, while the UWB slave device cannot measure the angle value between the UWB slave device and the UWB master device. After the UWB master device measures the angle value between the UWB master device and the UWB slave device, a sum of the angle value and an angle measurement error value set by the user may be sent to the UWB slave device, to blur angle measurement performed on the electronic device by the first device.

Step 602: The electronic device sends a second value to the first device.

In this embodiment of this application, the second value is a sum of the target angle value and the angle measurement error value, and the second value is used for the first device to determine the second value as the angle value between the first device and the electronic device.

It can be understood that the electronic device may accurately calculate the angle value between the electronic device and the first device according to the second formula, and then the electronic device may send the sum (namely, the second value) of the angle value and the set angle measurement error value to the first device, so that the first device may determine the second value as the angle value between the first device and the electronic device, that is, there is an error in the angle value between the first device and the electronic device determined by the first device. In this way, according to this solution, the angle measurement performed on the electronic device by the first device can be blurred, so that the first device cannot accurately obtain location information of the user, thereby avoiding leakage of user privacy, and improving safety of the electronic device performing angle measurement via the UWB module.

It should be noted that the privacy setting method for UWB detection provided in the embodiments of this application may be performed by a privacy setting apparatus for UWB detection or a control module for performing the privacy setting method for UWB detection in the privacy setting apparatus for UWB detection. In the embodiments of this application, the privacy setting apparatus for UWB detection performing the privacy setting method for UWB detection is used as an example to describe the privacy setting apparatus for UWB detection provided in the embodiments of this application.

Figure 12:
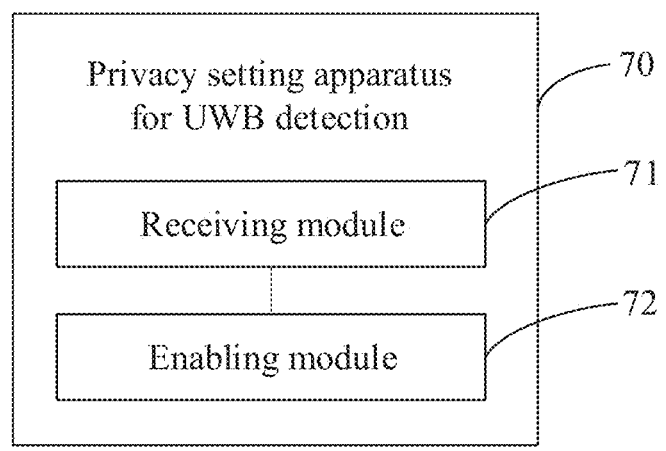
FIG. 12 is a schematic structural diagram of a privacy setting apparatus for UWB detection according to an embodiment of this application.

FIG. 12 is a possible schematic structural diagram of a privacy setting apparatus for UWB detection according to an embodiment of this application. As shown in FIG. 12, the privacy setting apparatus 70 for UWB detection may include a receiving module 71 and an enabling module 72.

The receiving module 71 is configured to: in a case that a first interface is displayed, receive a first input by a user, where the first interface includes at least one device identifier and at least one control, each device identifier is used to indicate a device that is detected by using a UWB function, each control corresponds to a privacy setting when an electronic device is detected by another device by using the UWB function, and the first input is an input by the user for a target control in the at least one control. The enabling module 72 is configured to: in response to the first input received by the receiving module, enable a privacy setting corresponding to the target control.

In a possible implementation, the at least one control includes at least one of the following: a first control, a second control, and a third control. The first control is used to set whether to allow the electronic device to be detected by the another device by using the UWB function, the second control is used to set to allow the electronic device to be detected by a device within a target range by using the UWB function, the third control is used to set a measurement error value between a first device and the electronic device, and the first device is a device for measuring the electronic device.

In a possible implementation, the target control is used to set to allow the electronic device to be detected by the device within the target range by using the UWB function. The apparatus provided in this embodiment of this application further includes an obtaining module, a sending module, and a prohibiting module. The obtaining module is configured to: after the enabling module enables the privacy setting corresponding to the target control, in a case that a signal sent by a second device is received, obtain a distance between the electronic device and the second device. The sending module is configured to: in a case that the distance between the electronic device and the second device is within the target range, send a response signal to the second device. The prohibiting module is configured to: in a case that the distance between the electronic device and the second device is outside the target range, prohibit sending the response signal to the second device.

In a possible implementation, the target control is used to set to allow the device within the target range to be detected by using the UWB function. The apparatus provided in this embodiment of this application further includes a deletion module. The deletion module is configured to: in a case that a target device is detected to be located outside the target range, delete a target device identifier in the first interface, where the target device identifier is an identifier, in the at least one device identifier, indicating the target device.

In a possible implementation, the target control is used to set a distance measurement error value. The apparatus provided in this embodiment of this application further includes a determining module and a sending module. The determining module is configured to: after the enabling module 72 enables the privacy setting corresponding to the target control, determine a target distance and a time error value according to a first formula; and determine a first time point and a second time point based on the time error value. The sending module is configured to send the first time point and the second time point to a first device, where the first time point and the second time point are used for the first device to determine a measurement distance between the first device and the electronic device.

The first formula is $$d = \frac{c \times \left[(t4 - t1) - \left(t3 - t2 - \frac{2D}{c}\right)\right]}{2} - D.$$

d is the target distance, c is a speed of light, t1 is a time point at which the first device sends a signal to the electronic device, t2 is a time point at which the electronic device receives the signal sent by the first device, t3 is a time point at which the electronic device sends a response signal to the first device, t4 is a time point at which the first device receives the response signal sent by the electronic device, and D is the distance measurement error value. The first time point is a time point corresponding to t2, the second time point is a time point corresponding to t3, the target distance is an actual distance between the electronic device and the first device, the measurement distance is a distance between the first device and the electronic device determined by the first device by using the UWB function, and the distance measurement error value is an error value of the measurement distance relative to the target distance.

In a possible implementation, the target control is used to set an angle measurement error value, the electronic device includes at least two antennas, and the first device includes at least one antenna. The apparatus provided in this embodiment of this application further includes a determining module and a sending module. The determining module is configured to: after the enabling module 72 enables the privacy setting corresponding to the target control, determine a target angle value by using a second formula, where the target angle value is an angle value between the electronic device and the first device. The sending module is configured to send a second value to the first device, where the second value is a sum of the target angle value and the angle measurement error value, and the second value is used for the first device to determine the second value as the angle value between the first device and the electronic device.

The second formula is $$\theta = \sin^{-1}\left(\frac{c(t2 - t1)}{2k}\right).$$

θ is the target angle value, c is a speed of light, t1 and t2 are time points at which the two antennas of the electronic device receive a signal sent by the first device, and k is a distance between the two antennas of the electronic device.

In a possible implementation, the first interface further includes at least one of the following: a distance measurement control and an angle measurement control, the distance measurement control is used to enable or disable a distance measurement function, and the angle measurement control is used to enable or disable an angle measurement function. The distance measurement function is used to measure a distance between the electronic device and the another device by using the UWB function, and the angle measurement function is used to measure an angle between the electronic device and the another device by using the UWB function.

According to the privacy setting apparatus for UWB detection provided in this embodiment of this application, in a case that the another device is detected by using the UWB function, the user may perform the first input on some controls (for example, the target control) in the at least one control (where each control corresponds to the privacy setting when the electronic device is detected by the another device by using the UWB function), to enable a privacy setting corresponding to the control, that is, the user can enable, by user-defining based on a usage requirement, a privacy setting related to detection by using the UWB function, that is, the user can set a related privacy function when the another device detects the electronic device by using the UWB function, to avoid leakage of user privacy, and achieve a purpose of protecting the user privacy, thereby improving safety of performing detection via the UWB module.

The privacy setting apparatus for UWB detection in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, a vehicle-mounted electronic device, a wearable device, an Ultra-Mobile Personal Computer (UMPC), a netbook, a Personal Digital Assistant (PDA), or the like. The non-mobile electronic device may be a server, a Network Attached Storage (NAS), a Personal Computer (PC), a Television (TV), a teller machine, a self-service machine, or the like. This is not specifically limited in the embodiments of this application.

The privacy setting apparatus for UWB detection in this embodiment of this application may be an apparatus with an operating system. The operating system may be an Android operating system, may be an iOS operating system, or may be another possible operating system. This is not specifically limited in this embodiment of this application.

The privacy setting apparatus for UWB detection provided in this embodiment of this application can implement the processes of the foregoing method embodiments, with the same technical effects achieved. To avoid repetition, details are not described herein again.

Figure 13:
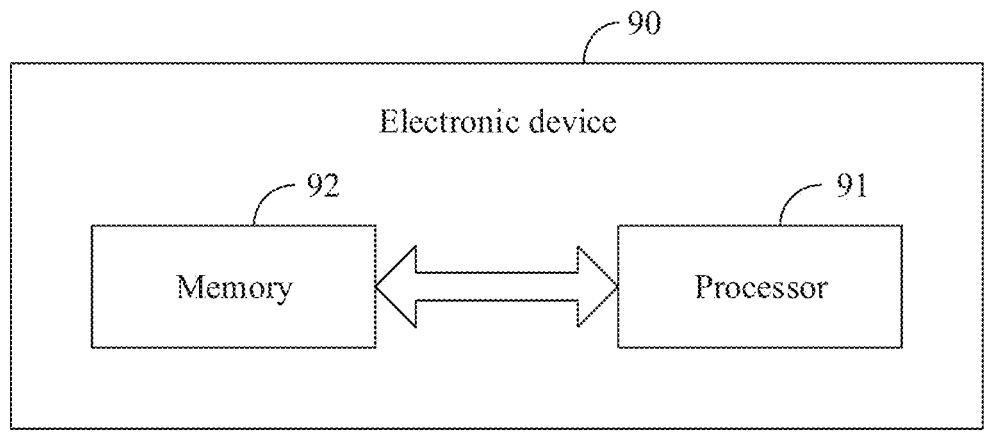
FIG. 13 is a first schematic diagram of a hardware structure of an electronic device according to an embodiment of this application.

For example, as shown in FIG. 13, an embodiment of this application further provides an electronic device 90, including a processor 91, a memory 92, and a program or an instruction stored in the memory 92 and executable on the processor 91. When the program or the instruction is executed by the processor 91, the processes of the foregoing method embodiments are implemented, with the same technical effects achieved. To avoid repetition, details are not described herein again.

It should be noted that the electronic device in this embodiment of this application includes the foregoing mobile electronic device and the foregoing non-mobile electronic device.

Figure 14:
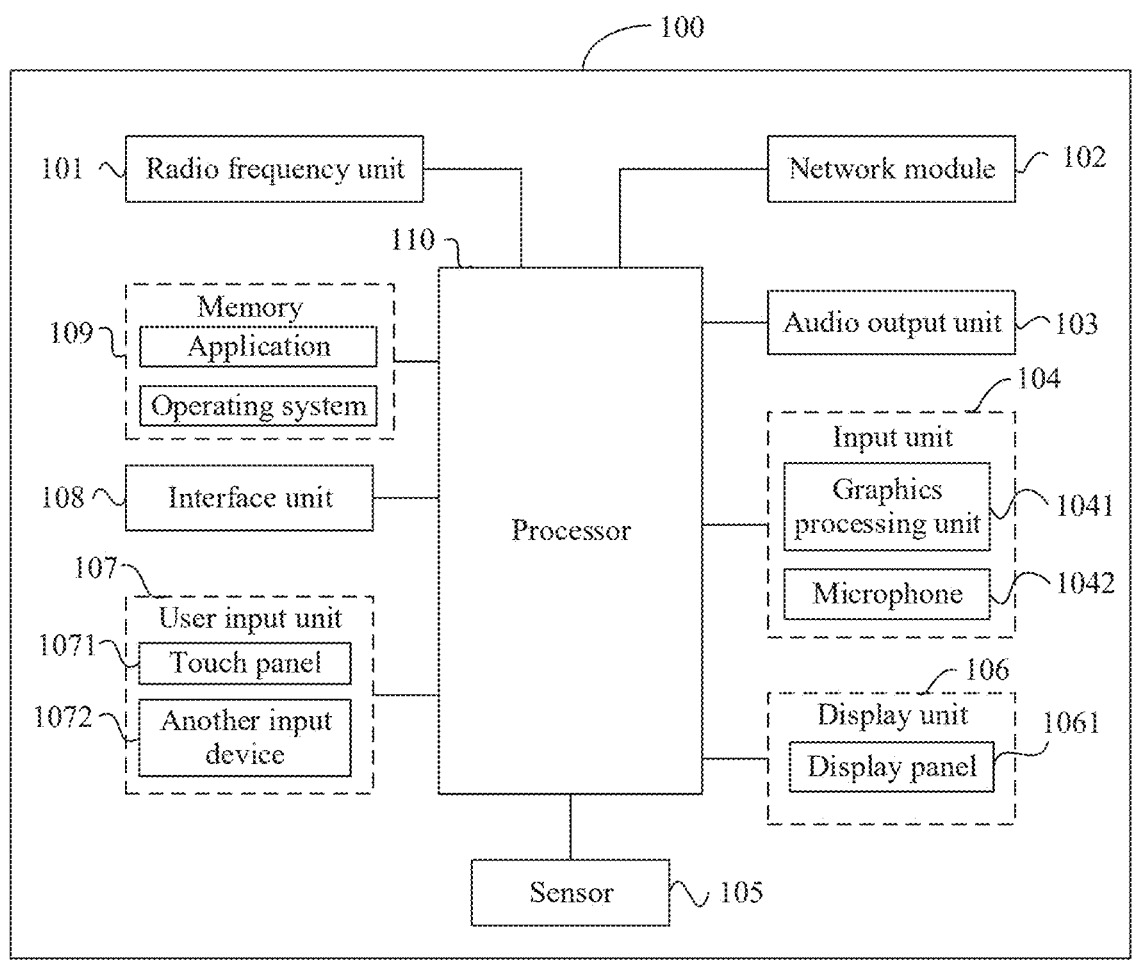
FIG. 14 is a second schematic diagram of a hardware structure of an electronic device according to an embodiment of this application.

FIG. 14 is a schematic diagram of a hardware structure of an electronic device for implementing the embodiments of this application.

The electronic device 100 includes but is not limited to components such as a radio frequency unit 101, a network module 102, an audio output unit 103, an input unit 104, a sensor 105, a display unit 106, a user input unit 107, an interface unit 108, a memory 109, and a processor 110.

A person skilled in the art can understand that the electronic device 100 may further include a power supply (such as a battery) for supplying power to the components. The power supply may be logically connected to the processor 110 via a power management system. In this way, functions such as charge management, discharge management, and power consumption management are implemented via the power management system. A structure of the electronic device shown in FIG. 14 does not constitute a limitation on the electronic device. The electronic device may include more or fewer components than those shown in the figure, or a combination of some components, or the components disposed differently. Details are not described herein again.

The user input unit 107 is configured to: in a case that a first interface is displayed, receive a first input by a user, where the first interface includes at least one device identifier and at least one control, each device identifier is used to indicate a device that is detected by using a UWB function, each control corresponds to a privacy setting when the electronic device is detected by another device by using the UWB function, and the first input is an input by the user for a target control in the at least one control.

The processor 110 is configured to: in response to the first input, enable a privacy setting corresponding to the target control.

This embodiment of this application provides the electronic device. In a case that the electronic device detects the another device by using the UWB function, the user may perform the first input on some controls (for example, the target control) in the at least one control (where each control corresponds to the privacy setting when the electronic device is detected by the another device by using the UWB function), so that the electronic device can enable a privacy setting corresponding to the control, that is, the user can enable, by user-defining based on a usage requirement, a privacy setting related to detection by using the UWB function, that is, the user can set, in the electronic device, a related privacy function when the another device detects the electronic device by using the UWB function, to avoid leakage of user privacy, and achieve a purpose of protecting the user privacy, thereby improving safety of the electronic device performing detection via a UWB module.

For example, in this embodiment of this application, the target control is used to set to allow the electronic device to be detected by a device within a target range by using the UWB function. The processor 110 is configured to: after an enabling module enables the privacy setting corresponding to the target control, in a case that a signal sent by a second device is received, obtain a distance between the electronic device and the second device. The radio frequency unit 101 is configured to: in a case that the distance between the electronic device and the second device is within the target range, send a response signal to the second device. The processor 110 is further configured to: in a case that the distance between the electronic device and the second device is outside the target range, prohibit sending the response signal to the second device.

For example, in this embodiment of this application, the target control is used to set to allow the device within the target range to be detected by using the UWB function. The processor 110 is further configured to: in a case that a target device is detected to be located outside the target range, delete a target device identifier in the first interface, where the target device identifier is an identifier, in the at least one device identifier, indicating the target device.

For example, in this embodiment of this application, the target control is used to set a distance measurement error value. The processor 110 is further configured to: after the privacy setting corresponding to the target control is enabled, determine a target distance and a time error value according to a first formula; and determine a first time point and a second time point based on the time error value. The radio frequency unit 101 is further configured to send the first time point and the second time point to a first device, where the first time point and the second time point are used for the first device to determine a measurement distance between the first device and the electronic device.

The first formula is $$d = \frac{c \times \left[(t4 - t1) - \left(t3 - t2 - \frac{2D}{c}\right)\right]}{2} - D.$$

d is the target distance, c is a speed of light, t1 is a time point at which the first device sends a signal to the electronic device, t2 is a time point at which the electronic device receives the signal sent by the first device, t3 is a time point at which the electronic device sends a response signal to the first device, t4 is a time point at which the first device receives the response signal sent by the electronic device, and D is the distance measurement error value. The first time point is a time point corresponding to t2, the second time point is a time point corresponding to t3, the target distance is an actual distance between the electronic device and the first device, the measurement distance is a distance between the first device and the electronic device determined by the first device by using the UWB function, and the distance measurement error value is an error value of the measurement distance relative to the target distance.

For example, in this embodiment of this application, the target control is used to set an angle measurement error value. The electronic device includes at least two antennas, and the first device includes at least one antenna. The processor 110 is further configured to: after the privacy setting corresponding to the target control is enabled, determine a target angle value by using a second formula, where the target angle value is an angle value between the electronic device and the first device. The radio frequency unit 101 is configured to send a second value to the first device, where the second value is a sum of the target angle value and the angle measurement error value, and the second value is used for the first device to determine the second value as the angle value between the first device and the electronic device.

The second formula is $$\theta = \sin^{-1}\left(\frac{c(t2 - t1)}{2k}\right).$$

θ is the target angle value, c is a speed of light, t1 and t2 are time points at which the two antennas of the electronic device receive a signal sent by the first device, and k is a distance between the two antennas of the electronic device.

The electronic device provided in this embodiment of this application can implement the processes of the foregoing method embodiments, with the same technical effects achieved. To avoid repetition, details are not described herein again.

For the effects of the implementations in this embodiment, refer to the effects of the corresponding implementations in the foregoing method embodiments. To avoid repetition, details are not described herein again.

It should be understood that in this embodiment of this application, the input unit 104 may include a Graphics Processing Unit (GPU) 1041 and a microphone 1042. The graphics processing unit 1041 processes image data of a static picture or a video obtained by an image capture apparatus (for example, a camera) in a video capture mode or an image capture mode. The display unit 106 may include a display panel 1061, and the display panel 1061 may be configured in a form of a liquid crystal display, an organic light-emitting diode, and the like. The user input unit 107 includes a touch panel 1071 and another input device 1072. The touch panel 1071 is also referred to as a touchscreen. The touch panel 1071 may include two parts: a touch detection apparatus and a touch controller. The another input device 1072 may include but is not limited to a physical keyboard, a functional button (such as a volume control button or a power on/off button), a trackball, a mouse, and a joystick, which are not further described herein. The memory 109 may be configured to store a software program and various data, including but not limited to an application program and an operating system. The processor 110 may be integrated with an application processor and a modem processor. The application processor mainly processes an operating system, a user interface, an application program, and the like. The modem processor mainly processes wireless communication. It can be understood that the modem processor may be not integrated in the processor 110.

An embodiment of this application further provides a readable storage medium. The readable storage medium stores a program or an instruction. When the program or the instruction is executed by a processor, the processes of the foregoing method embodiments are implemented, with the same technical effects achieved. To avoid repetition, details are not described herein again.

The processor is a processor in the electronic device in the foregoing embodiments. The readable storage medium includes a computer-readable storage medium such as a computer Read-Only Memory (ROM), a Random Access Memory (RAM), a magnetic disk, or an optical disc.

An embodiment of this application further provides a chip. The chip includes a processor and a communications interface. The communications interface is coupled to the processor. The processor is configured to run a program or an instruction to implement the processes of the foregoing method embodiments, with the same technical effects achieved. To avoid repetition, details are not described herein again.

It should be understood that the chip mentioned in this embodiment of this application may also be referred to as a system-level chip, a system chip, a chip system, or a system-on-chip.

It should be noted that, in this specification, the terms "include", "comprise", or any of their variants are intended to cover a non-exclusive inclusion, such that a process, a method, an article, or an apparatus that includes a series of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and apparatus in the implementations of this application is not limited to executing functions in the order shown or discussed but may also include executing the functions in a substantially simultaneous manner or in a reverse order depending on the functions involved. For example, the method described may be performed in an order different from that described, and various steps may be also added, omitted, or combined. In addition, features described with reference to some examples may be combined in other examples.

According to the foregoing description of the implementations, a person skilled in the art can clearly understand that the method in the foregoing embodiments may be implemented by software in combination with a necessary universal hardware platform or by hardware only. In some embodiments, the technical solutions of this application essentially or the part contributing to the prior art may be implemented in a form of a software product. The computer software product is stored in a storage medium (such as a ROM/RAM, a hard disk, or an optical disc), and includes several instructions for instructing a terminal (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing specific implementations. The foregoing specific implementations are merely illustrative rather than restrictive. As instructed by this application, a person of ordinary skill in the art may develop many other forms without departing from the principle of this application and the protection scope of the claims, and all such forms fall within the protection scope of this application.

The invention claimed is:

1. A privacy setting method for Ultra-Wideband (UWB) detection, performed by an electronic device, comprising:
   when a first interface is displayed, receiving a first input by a user,
   wherein:
      the first interface comprises: at least one device identifier, and at least one control,
      the at least one device identifier is used to indicate a device that is detected by the electronic device using a UWB function,
      the at least one control indicates a privacy setting of the electronic device when the electronic device is detected by another device using the UWB function, and
      the first input is an input by the user operating a target control of the at least one control; and
   in response to the first input, enabling the privacy setting corresponding to the target control on the electronic device,
   wherein:
   the target control is used to set a distance measurement error value; and
   after the privacy setting corresponding to the target control is enabled, the method further comprises:
      determining a target distance and a time error value according to a first formula; and
      determining a first time point and a second time point based on the time error value, and sending the first time point and the second time point to a first device, wherein the first time point and the second time point are used for the first device to determine a measurement distance between the first device and the electronic device,
   wherein:
   the first formula is $$d = \frac{c \times \left[ (t4 - t1) - \left( t3 - t2 - \frac{2D}{c} \right) \right]}{2} - D;$$

d is the target distance,
   c is a speed of light,
   t1 is a time point at which the first device sends a signal to the electronic device,
   t2 is a time point at which the electronic device receives the signal sent by the first device,
   t3 is a time point at which the electronic device sends a response signal to the first device,
   t4 is a time point at which the first device receives the response signal sent by the electronic device, and
   D is the distance measurement error value,
   wherein:
      the first time point is a time point corresponding to t2,
      the second time point is a time point corresponding to t3,
      the target distance is an actual distance between the electronic device and the first device,
      the measurement distance is a distance between the first device and the electronic device determined by the first device using the UWB function, and
      the distance measurement error value is an error value of the measurement distance relative to the target distance;
   or
   wherein:
   the target control is used to set an angle measurement error value, the electronic device comprises at least two antennas, and a first device comprises at least one antenna; and
   after the privacy setting corresponding to the target control is enabled, the method further comprises:
      determining a target angle value by using a second formula, wherein the target angle value is an angle value between the electronic device and the first device, and
      sending a second value to the first device, wherein the second value is a sum of the target angle value and the angle measurement error value, and the second value is used for the first device to determine the second value as the angle value between the first device and the electronic device,
   wherein the second formula is $$\theta = \sin^{-1}\left( \frac{c(t2 - t1)}{2k} \right),$$

wherein θ is the target angle value, c is a speed of light, t1 and t2 are time points at which the two antennas of the electronic device receive a signal sent by the first device, and k is a distance between the two antennas of the electronic device.

2. The privacy setting method according to claim 1, wherein the at least one control comprises at least one of the following: a first control, a second control, or a third control; and
   wherein:
      the first control is used to set whether to allow the electronic device to be detected by the another device using the UWB function,
      the second control is used to set to allow the electronic device to be detected by a device within a target range using the UWB function,
      the third control is used to set a measurement error value between a first device and the electronic device, and
      the first device is a device for measuring the electronic device.

3. The privacy setting method according to claim 1, wherein the target control is used to set to allow the electronic device to be detected by the device within the target range using the UWB function; and
   after the privacy setting corresponding to the target control is enabled, the method further comprises:
      when a signal sent by a second device is received, obtaining a distance between the electronic device and the second device;
      when the distance between the electronic device and the second device is within the target range, sending a response signal to the second device; and
      when the distance between the electronic device and the second device is outside the target range, prohibiting sending the response signal to the second device.

4. The privacy setting method according to claim 1, wherein:

the target control is used to set to allow the device within the target range to be detected by the electronic device using the UWB function; and the method further comprises:
when a target device is detected to be located outside the target range, deleting a target device identifier in the first interface, wherein the target device identifier is an identifier, in the at least one device identifier, indicating the target device.

5. The privacy setting method according to claim 1, wherein the first interface further comprises at least one of the following: a distance measurement control or an angle measurement control, wherein the distance measurement control is used to enable or disable a distance measurement function, and the angle measurement control is used to enable or disable an angle measurement function, wherein
the distance measurement function is used to measure a distance between the electronic device and the another device using the UWB function, and the angle measurement function is used to measure an angle between the electronic device and the another device using the UWB function.

6. An electronic device, comprising a processor; and a memory having a computer program or an instruction stored thereon, wherein the computer program or the instruction, when executed by the processor, causes the processor to perform operations, comprising:
when a first interface is displayed, receiving a first input by a user,
wherein:
the first interface comprises: at least one device identifier, and at least one control,
the at least one device identifier is used to indicate a device that is detected by the electronic device using an Ultra-Wideband (UWB) function,
the at least one control indicates a privacy setting of the electronic device when the electronic device is detected by another device using the UWB function, and
the first input is an input by the user operating a target control of the at least one control; and
in response to the first input, enabling the privacy setting corresponding to the target control on the electronic device,
wherein:
the target control is used to set a distance measurement error value, and
after the privacy setting corresponding to the target control is enabled, the operations further comprise:
determining a target distance and a time error value according to a first formula; and
determining a first time point and a second time point based on the time error value, and sending the first time point and the second time point to a first device, wherein the first time point and the second time point are used for the first device to determine a measurement distance between the first device and the electronic device,
wherein:

$$d = \frac{c \times \left[ (t4 - t1) - \left(t3 - t2 - \frac{2D}{c}\right) \right]}{2} - D;$$

the first formula is
d is the target distance,
c is a speed of light,
t1 is a time point at which the first device sends a signal to the electronic device,
t2 is a time point at which the electronic device receives the signal sent by the first device,
t3 is a time point at which the electronic device sends a response signal to the first device,
t4 is a time point at which the first device receives the response signal sent by the electronic device, and
D is the distance measurement error value,
wherein:
the first time point is a time point corresponding to t2,
the second time point is a time point corresponding to t3,
the target distance is an actual distance between the electronic device and the first device,
the measurement distance is a distance between the first device and the electronic device determined by the first device using the UWB function, and
the distance measurement error value is an error value of the measurement distance relative to the target distance;

or
wherein:
the target control is used to set an angle measurement error value, the electronic device comprises at least two antennas, and a first device comprises at least one antenna; and
after the privacy setting corresponding to the target control is enabled, the operations further comprises:
determining a target angle value by using a second formula, wherein the target angle value is an angle value between the electronic device and the first device, and
sending a second value to the first device, wherein the second value is a sum of the target angle value and the angle measurement error value, and the second value is used for the first device to determine the second value as the angle value between the first device and the electronic device,
wherein the second formula is $$\theta = \sin^{-1}\left(\frac{c(t2 - t1)}{2k}\right),$$

wherein θ is the target angle value, c is a speed of light, t1 and t2 are time points at which the two antennas of the electronic device receive a signal sent by the first device, and k is a distance between the two antennas of the electronic device.

7. The electronic device according to claim 6, wherein the at least one control comprises at least one of the following: a first control, a second control, or a third control; and
wherein:
the first control is used to set whether to allow the electronic device to be detected by the another device using the UWB function,
the second control is used to set to allow the electronic device to be detected by a device within a target range using the UWB function,
the third control is used to set a measurement error value between a first device and the electronic device, and the first device is a device for measuring the electronic device.

8. The electronic device according to claim 6, wherein the target control is used to set to allow the electronic device to be detected by the device within the target range using the UWB function; and
after the privacy setting corresponding to the target control is enabled, the operations further comprise:
when a signal sent by a second device is received, obtaining a distance between the electronic device and the second device;
when the distance between the electronic device and the second device is within the target range, sending a response signal to the second device; and
when the distance between the electronic device and the second device is outside the target range, prohibiting sending the response signal to the second device.

9. The electronic device according to claim 6, wherein:
the target control is used to set to allow the other device within the target range to be detected by the electronic device using the UWB function; and
the operations further comprise:
when a target device is detected to be located outside the target range, deleting a target device identifier in the first interface, wherein the target device identifier is an identifier, in the at least one device identifier, indicating the target device.

10. The electronic device according to claim 6, wherein the first interface further comprises at least one of the following: a distance measurement control or an angle measurement control, wherein the distance measurement control is used to enable or disable a distance measurement function, and the angle measurement control is used to enable or disable an angle measurement function, wherein
the distance measurement function is used to measure a distance between the electronic device and the another device using the UWB function, and the angle measurement function is used to measure an angle between the electronic device and the another device using the UWB function.

11. A non-transitory computer-readable storage medium storing a computer program or an instruction that, when executed by a processor, causes the processor to perform operations, comprising:
when a first interface is displayed, receiving a first input by a user,
wherein:
the first interface comprises: at least one device identifier, and at least one control,
the at least one device identifier is used to indicate a device that is detected by an electronic device using an Ultra-Wideband (UWB) function,
the at least one control indicates a privacy setting of the electronic device when the electronic device is detected by another device using the UWB function, and
the first input is an input by the user operating a target control of the at least one control; and
in response to the first input, enabling the privacy setting corresponding to the target control on the electronic device,
wherein:
the target control is used to set a distance measurement error value, and
after the privacy setting corresponding to the target control is enabled, the operations further comprise:
determining a target distance and a time error value according to a first formula; and
determining a first time point and a second time point based on the time error value, and sending the first time point and the second time point to a first device, wherein the first time point and the second time point are used for the first device to determine a measurement distance between the first device and the electronic device,
wherein:
the first formula is $$d = \frac{c \times \left[(t4 - t1) - \left(t3 - t2 - \frac{2D}{c}\right)\right]}{2} - D;$$

d is the target distance,
c is a speed of light,
t1 is a time point at which the first device sends a signal to the electronic device,
t2 is a time point at which the electronic device receives the signal sent by the first device,
t3 is a time point at which the electronic device sends a response signal to the first device,
t4 is a time point at which the first device receives the response signal sent by the electronic device, and
D is the distance measurement error value,
wherein:
the first time point is a time point corresponding to t2,
the second time point is a time point corresponding to t3,
the target distance is an actual distance between the electronic device and the first device,
the measurement distance is a distance between the first device and the electronic device determined by the first device using the UWB function, and
the distance measurement error value is an error value of the measurement distance relative to the target distance;
or
wherein:
the target control is used to set an angle measurement error value, the electronic device comprises at least two antennas, and a first device comprises at least one antenna; and
after the privacy setting corresponding to the target control is enabled, the operations further comprises:
determining a target angle value by using a second formula, wherein the target angle value is an angle value between the electronic device and the first device, and
sending a second value to the first device, wherein the second value is a sum of the target angle value and the angle measurement error value, and the second value is used for the first device to determine the second value as the angle value between the first device and the electronic device,
wherein the second formula is $$\theta = \sin^{-1}\left(\frac{c(t2 - t1)}{2k}\right),$$

wherein θ is the target angle value, c is a speed of light, t1 and t2 are time points at which the two antennas of the electronic device receive a signal sent by the first device, and k is a distance between the two antennas of the electronic device.

12. The non-transitory computer-readable storage medium according to claim 11, wherein the at least one control comprises at least one of the following: a first control, a second control, or a third control; and
wherein:
the first control is used to set whether to allow the electronic device to be detected by the another device using the UWB function,
the second control is used to set to allow the electronic device to be detected by the device within a target range using the UWB function,
the third control is used to set a measurement error value between a first device and the electronic device, and
the first device is a device for measuring the electronic device.

13. The non-transitory computer-readable storage medium according to claim 11, wherein the target control is used to set to allow the electronic device to be detected by the device within the target range using the UWB function; and after the privacy setting corresponding to the target control is enabled, the operations further comprise:
when a signal sent by a second device is received, obtaining a distance between the electronic device and the second device;
when the distance between the electronic device and the second device is within the target range, sending a response signal to the second device; and
when the distance between the electronic device and the second device is outside the target range, prohibiting sending the response signal to the second device.

14. The non-transitory computer-readable storage medium according to claim 11, wherein:
the target control is used to set to allow the device within the target range to be detected by the electronic device using the UWB function; and
the operations further comprise:
when a target device is detected to be located outside the target range, deleting a target device identifier in the first interface, wherein the target device identifier is an identifier, in the at least one device identifier, indicating the target device.

* * * * *